United States Patent
Amthor et al.

(10) Patent No.: US 12,003,101 B2
(45) Date of Patent: *Jun. 4, 2024

(54) METHOD FOR CONTROLLING AN EXCHANGE OF ENERGY IN AN ENERGY SYSTEM, CONTROL CENTER, ENERGY SYSTEM, AND STORAGE MEDIUM

(71) Applicant: Siemens Aktiengesellschaft, Munich (DE)

(72) Inventors: Arvid Amthor, Grabfeld OT Nordheim (DE); Thomas Baumgärtner, Erlangen (DE); Sebastian Schreck, Nuremberg (DE); Sebastian Thiem, Neustadt an der Aisch (DE); Lisa Wagner, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 544 days.

This patent is subject to a terminal disclaimer.

(21) Appl. No.: 17/270,753

(22) PCT Filed: Aug. 20, 2019

(86) PCT No.: PCT/EP2019/072202
§ 371 (c)(1),
(2) Date: Feb. 23, 2021

(87) PCT Pub. No.: WO2020/043542
PCT Pub. Date: Mar. 5, 2020

(65) Prior Publication Data
US 2021/0344224 A1 Nov. 4, 2021

(30) Foreign Application Priority Data
Aug. 30, 2018 (DE) ..................... 10 2018 214 717.5

(51) Int. Cl.
*H02J 13/00* (2006.01)
*G05B 13/04* (2006.01)

(52) U.S. Cl.
CPC ...... *H02J 13/00034* (2020.01); *G05B 13/042* (2013.01); *H02J 13/00002* (2020.01)

(58) Field of Classification Search
CPC ................................................ H02J 13/00034
See application file for complete search history.

(56) References Cited

U.S. PATENT DOCUMENTS

2008/0272192 A1* 11/2008 Lin .................. G07F 7/0866
235/381
2010/0217550 A1* 8/2010 Crabtree .............. H02J 3/007
702/62

(Continued)

FOREIGN PATENT DOCUMENTS

CN 105122572 A 12/2015 .............. H02J 3/04
CN 105207267 A 12/2015 .............. H02J 3/38

(Continued)

OTHER PUBLICATIONS

Korean Office Action, Application No. 20217009318, 3 pages, dated May 12, 2023.

(Continued)

*Primary Examiner* — Suresh Suryawanshi
(74) *Attorney, Agent, or Firm* — Slayden Grubert Beard PLLC

(57) ABSTRACT

Various embodiments include a method for controlling an exchange of energy in an energy system with multiple energy subsystems connected to one another for exchanging energy comprising: receiving first supply data at a control center from a first subsystem, wherein the first supply data represent respective remuneration conditions of the first subsystem for receiving and/or providing energy; transmitting the first supply data to a second subsystem; receiving (Continued)

second supply data at the control center, the second supply data responsive to the first supply data, from the second subsystem, wherein the second supply data represent respective remuneration conditions of the second subsystem for receiving and/or providing energy, and controlling an energy exchange between the first subsystem and the second subsystem based on both the first supply data and the second supply data.

19 Claims, 2 Drawing Sheets

(56) References Cited

U.S. PATENT DOCUMENTS

| | | | |
|---|---|---|---|
| 2014/0365022 A1* | 12/2014 | Ghosh | G06Q 50/06 700/291 |
| 2015/0286973 A1* | 10/2015 | Becher | G06Q 10/06313 705/7.23 |
| 2016/0056631 A1 | 2/2016 | Ilo | 700/287 |
| 2016/0141873 A1 | 5/2016 | Ellice-flint et al. | 307/20 |
| 2017/0194814 A1 | 7/2017 | Chakraborty et al. | |
| 2019/0236726 A1* | 8/2019 | Unagami | G06Q 20/389 |

FOREIGN PATENT DOCUMENTS

| | | | |
|---|---|---|---|
| DE | 10 2012 221 291 | 5/2014 | G06Q 20/08 |
| EP | 1 202 425 | 5/2002 | H02J 3/00 |
| JP | 2017511683 A | 4/2017 | H02J 13/00 |
| KR | 20110034888 A | 4/2011 | G06F 19/00 |
| KR | 20180083606 A | 7/2018 | G06Q 30/06 |

OTHER PUBLICATIONS

Hoppe-Kilpper, M. et al., "Integration erneuerbarer Energien und dezentrale Energieversorgung—Aufbau von Versorgungsstrukturen mit hohem Anteil Erneuerbarer Energien," FVS Themen, ISSN 0939-7582; Forschungsverbund Sonnenenergie, 52 Pages (German language w/ English abstract), 2001.

Hommelberg, M.P.F. et al., "Distributed Control Concepts using Multi-Agent Technology and Automatic Markets: An Indispensable Feature of Smart Power Grids," IEEE 1-4244-1298—Jun. 2007, ISSN 1932-5517, pp. 1-7.

Giuntoli, Marco et al., "Optimized Thermal and Electrical Scheduling of a Large Scale Virtual Power Plant in the Presence of Energy Storages," IEEE Transactions on Smart Grid, vol. 4, No. 2, pp. 942-955, May 18, 2013.

Wikipedia, "Virtuelles Kraftwerk," URL: https://de.wikipedia.org/w/index.php?title=Virtuelles_Kraftwerk&oldid, 14 pages (German language w/ English translation), Apr. 9, 2018.

Search Report for International Application No. PCT/EP2019/072202, 10 pages, dated Oct. 21, 2019.

Korean Office Action, Application No. 2022091645151, 5 pages, dated Nov. 25, 2022.

Chinese Office Action, Application No. 201980055852.1, 22 pages, dated Sep. 14, 2023.

* cited by examiner

METHOD FOR CONTROLLING AN EXCHANGE OF ENERGY IN AN ENERGY SYSTEM, CONTROL CENTER, ENERGY SYSTEM, AND STORAGE MEDIUM

CROSS-REFERENCE TO RELATED APPLICATIONS

This application is a U.S. National Stage Application of International Application No. PCT/EP2019/072202 filed Aug. 20, 2019, which designates the United States of America, and claims priority to DE Application No. 10 2018 214 717.5 filed Aug. 30, 2018, the contents of which are hereby incorporated by reference in their entirety.

TECHNICAL FIELD

The present disclosure relates to energy systems. Various embodiments include methods for controlling an exchange of energy in an energy system having multiple energy subsystems that are each connected to one another for the purpose of exchanging energy, control centers, energy systems, computer programs, and/or storage media.

BACKGROUND

Electrical energy is produced and consumed on an electricity grid in a balanced ratio. Modest grid-based storage capabilities for electrical energy make it necessary for electrical energy to be produced at the same time as it is consumed. In particular the building of decentralized small power stations, for example photovoltaic installations, cogeneration units, biogas installations, wind turbines for power generation and stationary storage systems, in particular battery stores, necessitates simple and efficient control or feedback control.

SUMMARY

The teachings of the present disclosure may be employed to provide improved control of an exchange of energy. For example, some embodiments of the teachings herein include a method for controlling an exchange of energy in an energy system (1) having multiple energy subsystems (3) that are each connected to one another for the purpose of exchanging energy, having the steps of: a control center (2) receiving first supply data (6) from a first (10) of the energy subsystems (3), wherein the first supply data (6) comprise respective remuneration conditions of the first energy subsystem (10) for receiving and/or providing energy, transmitting the first supply data (6) to a second (11, 12) of the multiple energy subsystems (3), the control center (2) receiving second supply data (7) adapted for the first supply data (6) from the second energy subsystem (11, 12), wherein the second supply data (7) comprise respective remuneration conditions of the second energy subsystem (11, 12) for receiving and/or providing energy, and the control center (2) controlling the exchange of energy between the first (10) and the second (11, 12) energy subsystem in accordance with the first (6) and second (7) supply data.

In some embodiments, the first (6) and the second (7) supply data relate to a common time interval in which the exchange of energy is supposed to be effected.

In some embodiments, the first supply data (6) are determined by the first energy subsystem (10) on the basis of a system state of the first energy subsystem (10) and/or the second supply data (7) are determined by the second energy subsystem (11, 12) on the basis of a system state of the second energy subsystem (11, 12).

In some embodiments, the respective system state of the first energy subsystem (10) and/or of the second energy subsystem (11, 12) is based on a measurement and/or a forecast.

In some embodiments, the first (6) or second (7) supply data are determined by virtue of the first energy subsystem (10) and/or the second energy subsystem (11, 12) solving an optimization problem, in particular for the purposes of optimum control or optimization of operation, on the basis of the respective system state.

In some embodiments, a divergence between a previously forecast system state for a time interval and a system state determined later for the same time interval results in the first (6) or second (7) supply data being determined such that the divergence is minimized.

In some embodiments, a grid utilization remuneration is determined for a distribution grid (5) used for exchanging energy.

In some embodiments, the grid utilization remuneration is transmitted to the second energy subsystem (11, 12) together with the first supply data (6) and/or the first supply data (6) are adapted in accordance with the grid utilization remuneration.

In some embodiments, the grid utilization remuneration is determined on the basis of a distance between the first (10) and the second (11, 12) energy subsystem and/or on the basis of a grid utilization level of the distribution grid (5).

In some embodiments, an amount of energy (8) needing to be transferred is determined during control of the exchange of energy between the first (10) and the second (11, 12) energy subsystem.

In some embodiments, an amount of energy (9) actually transferred is determined after the exchange of electrical energy has been effected, and this is taken as a basis for determining a measure of divergence that characterizes a divergence between the amount of energy (8) needing to be transferred and the amount of energy (9) actually transferred.

As another example, some embodiments include a control center (2) configured to perform a method as described herein.

As another example, some embodiments include an energy system (1) having: multiple control units (4) for controlling a respective energy subsystem (3) with regard to an exchange of energy of the energy subsystem (3) with other energy subsystems (3), and a control center for receiving first supply data (6) from a first (10) of the energy subsystems (3), wherein the first supply data (6) comprise respective remuneration conditions of the first energy subsystem (10) for receiving and/or providing energy, for transmitting the first supply data (6) to a second (11, 12) of the multiple energy subsystems (3), for receiving second supply data (7) adapted for the first supply data (6) from the second energy subsystem (11, 12), wherein the second supply data (7) comprise respective remuneration conditions of the second energy subsystem (11, 12) for receiving and/or providing energy, and for controlling the exchange of energy between the first (10) and the second (11, 12) energy subsystem in accordance with the first (6) and second (7) supply data.

As another example, some embodiments include a computer program loadable directly into a memory of a control center (2) of an energy system (1), having program code means in order to carry out the steps of the method for controlling an exchange of electrical energy as described herein when the program is executed in the control center (2) of the energy system (1).

As another example, some embodiments include a storage medium having electronically readable control information stored thereon that comprises at least one computer program as described herein and is designed such that it performs a method for controlling an exchange of electrical energy as described herein when the storage medium is used in a control center (2) of an energy system (1).

BRIEF DESCRIPTION OF THE DRAWINGS

The teachings of the present disclosure are discussed in greater detail below with reference to the accompanying drawings, in which.

DETAILED DESCRIPTION

Figure 1:
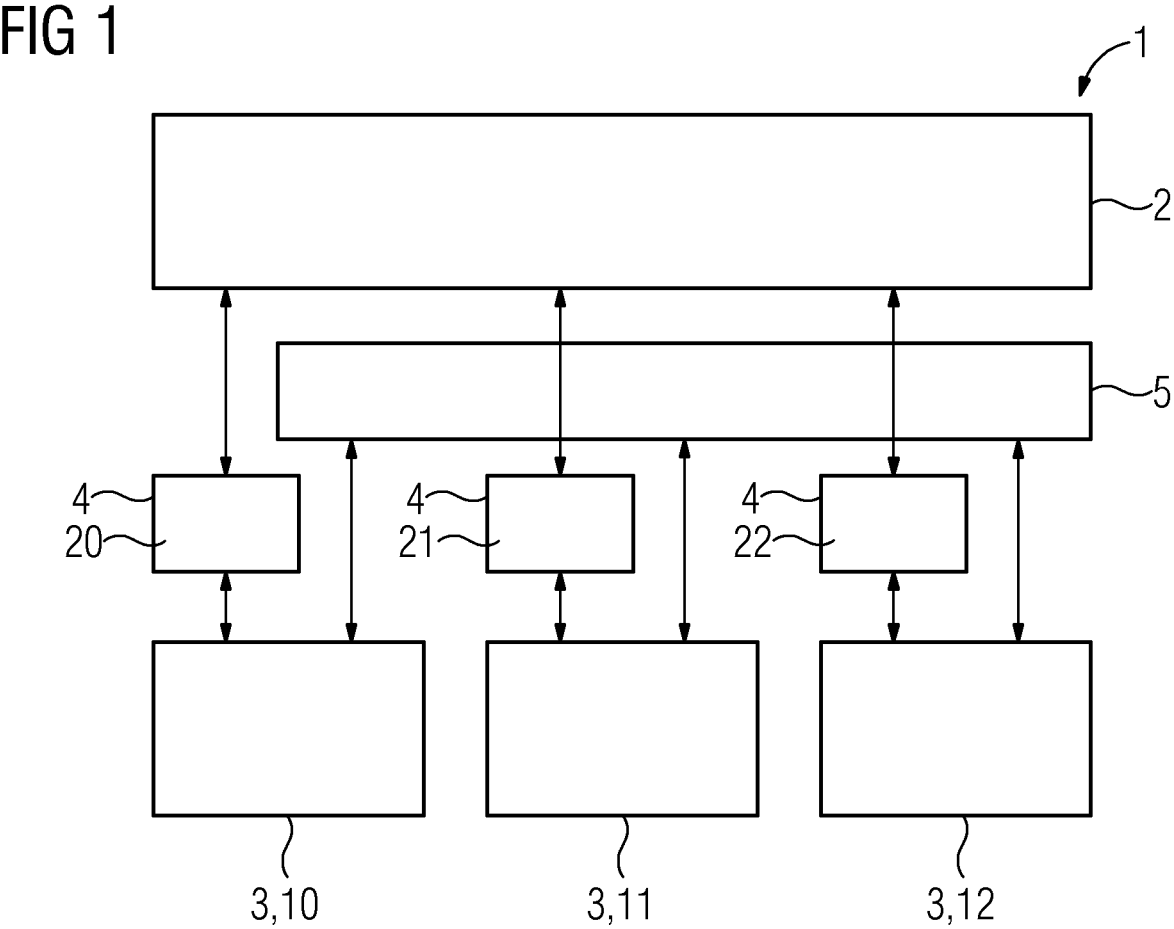
FIG. 1 shows a block diagram of multiple energy subsystems and a control center incorporating teachings of the present disclosure.

Some embodiments of the teachings herein include methods for controlling an exchange of energy in an energy system having multiple energy subsystems that are each connected to one another for the purpose of exchanging energy, having the following steps:

a control center receiving first supply data from a first of the energy subsystems, wherein the first supply data comprise respective remuneration conditions of the first energy subsystem for receiving and/or providing energy, transmitting the first supply data to a second of the multiple energy subsystems, the control center receiving second supply data adapted for the first supply data from the second energy subsystem, wherein the second supply data comprise respective remuneration conditions of the second energy subsystem for receiving and/or providing energy, and the control center controlling the exchange of energy between the first and the second energy subsystem in accordance with the first and second supply data.

In some embodiments, the energy is electrical energy. However, it can alternatively also be heat or cold. In other words the term "energy" may refer to, without limitation, "electrical energy", "thermal energy", and/or "cold energy". The text below refers to "electrical energy" but does not limit the scope of the teachings; on the contrary, all of the embodiments below relating to electrical energy apply analogously to other energy forms too.

The aforementioned energy system can comprise the control center and the multiple energy subsystems. Alternatively, it is possible for the energy subsystems to be controlled by a respective control unit. In this case the communication of the respective energy subsystem with the control center is effected by the applicable control unit of the respective energy subsystem. In this case the energy system can comprise for example multiple control units for each of the energy subsystems and the control center. The supply data can then be received from the respective control units of the energy subsystems. The exchange of electrical energy between the energy subsystems can be controlled by controlling the respective control units of the energy subsystems.

In some embodiments, the energy subsystems can each extend over a single household, over a single building, or over a factory. Each of the energy subsystems can comprise for example one or more of the following installations: photovoltaic installation, biogas installations, cogeneration unit, electrical energy store (in particular stationary battery store), electric vehicle, wind generator. Additionally, the energy subsystems can comprise pure consumers of electrical energy such as for example industrial installations, cooking appliances, washing machines or arbitrary household appliances. The energy system may be formed for example from the energy subsystems of a region, a city, a community, a district or a region defined in another manner. There is in particular provision for the energy system to extend over an area of suitable size. In particular there is provision for multiple physically separate energy systems to coexist in a country. The control center can be a central server of the energy system. The server can communicate with the energy subsystems, in particular with the control units thereof, for example via the Internet. The control center does not necessarily have to be in the region covered by the energy system.

The respective supply data can indicate the remuneration conditions under which a respective energy subsystem is prepared to receive and/or provide electrical energy. The remuneration conditions can comprise for example a price for an amount of energy. In some embodiments, the supply data therefore contain a quote to provide a specific amount of energy under specific remuneration conditions, that is to say in particular at a specific price, and/or a demand to purchase a specific amount of energy under specific remuneration conditions. These so-called specific remuneration conditions and/or the so-called specific amount of energy can be determined by the first energy subsystem on the basis of the operation thereof, in particular on the basis of a system state of the first energy subsystem.

The second supply data can be determined by the second energy subsystem such that at least partial concordance with the first supply data is achieved. Energy can be exchanged in this case. In some embodiments, the second supply data contain an acceptance of the quote transmitted by means of the first supply data or of the demand transmitted by means of the first supply data. In this way the second energy subsystem can declare itself prepared to provide or purchase the aforementioned specific amount of energy at the aforementioned specific price. Alternatively, the second supply data can be used to transmit a counteroffer containing for example the acceptance of only part of the specific amount of energy offered by means of the first supply data or the provision of only part of the amount of energy demanded by means of the first supply data. Alternatively, the second supply data can be used to propose other remuneration conditions than those transmitted by means of the first supply data.

In some embodiments, the first and/or the second supply data may be generated in automated fashion by the respective control device of the applicable energy subsystem. In some embodiments, the operation of the energy subsystems is optimized by the respective control unit of an applicable energy subsystem. The exchange of energy between the first energy subsystem and the second energy subsystem allows the operation or the operating state of both the first energy subsystem and the second energy subsystem to be improved or optimized. In other words, the exchange of energy allows an efficiency of the energy system as a whole to be increased.

When controlling the exchange of energy between the first and second energy subsystems, the control center can stipulate when and to what extent the energy is exchanged. In some embodiments, the control center accomplishes this by transmitting respective control data to the first and second energy subsystems. This allows the exchange of energy to be controlled directly or indirectly by the control center.

In some embodiments, the first supply data may relate to a first time interval and for the second supply data may relate to a second time interval. In this case there is provision for the respective transmitted remuneration conditions for receiving and/or providing energy to be valid only for the time interval to which the respective supply data relate. In some embodiments, the exchange of energy may be effected in the applicable time interval. In particular, the first and second supply data are used to plan the exchange of energy for the respective time interval in advance.

Denoting the energy subsystems as "first energy subsystem" and "second energy subsystem" is used primarily for improved description in the present case. An energy subsystem can act as "first energy subsystem" and "second energy subsystem" at different times or at the same time for the purposes of the present disclosure. In some embodiments, the first supply data may be transmitted by the control center not to a single second energy subsystem but rather to multiple second energy subsystems. In some embodiments, the control center may receive supply data from multiple first control centers first.

In some embodiments, the first supply data and the second supply data may relate to a common time interval in which the exchange of energy is supposed to be effected. In other words, a respective quote to provide energy and/or a respective demand to receive electrical energy, which can each be received by means of the first supply data or the second supply data, relates only to the stated time interval in each case. In some embodiments, no energy may be able to be exchanged if the first and second supply data relate to different time intervals. This allows the exchange to be improved further.

In some embodiments, the first supply data may be determined by the first energy subsystem on the basis of a system state of the first energy subsystem and/or the second supply data may be determined by the second energy subsystem on the basis of a system state of the second energy subsystem. In particular, the system state of the respective energy subsystem can comprise an estimated consumption of electrical energy by the respective subsystem, a state of charge of an energy store of the respective energy subsystem and/or weather data or a weather forecast. In particular, the system state for the first and/or second time interval may be modeled, calculated or simulated in advance. This allows the operation of the energy system and of the individual energy subsystems to be improved.

In some embodiments, the respective system state of the first energy subsystem and/or of the second energy subsystem may be based on a measurement and/or a forecast. In other words, the respective system state of the energy subsystems can be forecast in advance.

In particular, the respective system state is forecast at the beginning of the first or second time interval. This allows more flexible operation of the energy subsystems to be achieved.

In some embodiments, the first or second supply data may be determined by virtue of the first energy subsystem and/or the second energy subsystem solving an optimization problem, in particular for the purposes of optimum control or optimization of operation, on the basis of the respective system state. In other words, the first or the second supply data can be the result of such an optimization problem for the first and/or the second energy subsystem on the basis of the respective system state. In some embodiments, the respective optimization problem of an energy subsystem is solved using only the system state of the applicable energy subsystem. In other embodiments, the respective system state of one or more further instances of the multiple energy subsystems can be used in addition. This allows the operation of the individual energy subsystems and hence of the energy system as a whole to be improved.

In some embodiments, a divergence between a previously forecast system state for a time interval and a system state determined later for the same time interval may result in the first or second supply data being determined such that the divergence is minimized. For example, a divergence between a previously forecast system state and a system state determined, that is to say measured, later occurs for a specific time interval of the first or second energy subsystem. The first or second supply data can then be determined, for example by the applicable energy subsystem or the control unit thereof, such that this divergence is minimized. In one specific example this can mean that the respective energy subsystem produces less energy than was forecast, the energy store is drained more heavily than was forecast and/or a different instance of the multiple energy subsystems has been accepted for the provision of an amount of energy for the applicable time interval. In this case the applicable supply data can be used to match the operation of the applicable energy subsystem to the forecast, for example by transmitting a request for additional energy. The system state determined later can be measured for example at the beginning of the time interval or can be a later, more accurate forecast than the forecast made previously. This allows a flexibility of the energy subsystems to be increased.

In some embodiments, a grid utilization remuneration may be determined for a distribution grid used for exchanging energy. For example, the grid utilization remuneration is calculated on the basis of a use of the distribution grid according to a predetermined rule. The grid utilization remuneration can be taken into consideration when controlling the exchange of energy. The distribution grid is in particular an electricity grid, in particular if the energy is electrical energy. If the energy is thermal or cold energy, for example, then the distribution grid can be a district heating system or a similar distribution grid. This means that it is possible to allow for the transfer of electrical energy resulting in an additional expenditure.

In some embodiments, the grid utilization remuneration may be transmitted to the second energy subsystem together with the first supply data and/or for the first supply data to be adapted in accordance with the grid utilization remuneration. The transmitting and adapting can be effected by the control center. In some embodiments, this transmitting and adapting is effected in automated fashion. If the grid utilization remuneration is transmitted to the second energy subsystem then it can be taken into consideration by the second supply data. In other words, the control center then receives second supply data adapted for the grid utilization remuneration. For example, a price of the grid utilization remuneration given a price per amount of energy is taken into consideration in the second supply data. This allows the grid utilization remuneration or grid costs to be taken into consideration.

In some embodiments, the grid utilization remuneration may be determined on the basis of a distance between the first and the second energy subsystem and/or on the basis of a grid utilization level of the distribution grid. In other words, the grid utilization remuneration can be stipulated on the basis of the distance between the first and the second energy subsystem and/or on the basis of the grid utilization level of the distribution grid. For example, a price stipulated by the grid utilization remuneration is stipulated to be higher the greater the distance between the first and the second energy subsystem and/or the higher a grid utilization level at the time of the exchange of electrical energy. This allows the grid utilization level of the distribution grid to be controlled particularly well. In particular, it is possible for too low a grid utilization level to be counteracted by decreasing the grid utilization remuneration and for too high a grid utilization level to be counteracted by increasing the grid utilization remuneration.

In some embodiments, the grid utilization remuneration may be determined by the control center or received from a further server device by the control center. In the former case the control center can retrieve and/or may have stored information, for example a map and performance data, about the distribution grid and can calculate the grid utilization remuneration therefrom. In the other case the control center can receive the grid utilization remuneration from the further control center, in particular via the Internet. The further control center can be for example the control center of the distribution grid or of a grid supplier.

In some embodiments, an amount of energy needing to be transferred to be determined during control of the exchange of electrical energy between the first and the second energy subsystem. In particular, the amount of energy needing to be transferred that is stipulated by the control center can be the amount of energy that needs to be transferred by the first to the second energy subsystem and/or by the second to the first energy subsystem. This stipulation is made in particular on the basis of the first and the second supply data and also optionally on the basis of the grid utilization remuneration. In particular, the amount of energy needing to be transferred relates to the aforementioned time interval for which the first supply data and the second supply data have validity. The amount of energy needing to be transferred allows the exchange of electrical energy to be specified in addition.

In some embodiments, an amount of energy actually transferred may be determined after the exchange of electrical energy has been effected, and this may be taken as a basis for determining a measure of divergence that characterizes a divergence between the amount of energy needing to be transferred and the amount of energy actually transferred. In other words, after the exchange of electrical energy the amount of energy transferred during the exchange is determined. The amount of energy transferred and the previously stipulated amount of energy needing to be transferred are then taken as a basis for determining the measure of divergence that indicates the divergence between these two variables. The measure of divergence can be greater the greater the divergence between the amount of energy actually transferred and the amount of energy needing to be transferred. Alternatively, the absolute value of the measure of divergence can indicate the divergence, and the arithmetic sign of the measure of divergence can indicate whether the amount of energy actually transferred is greater than or less than the amount of energy needing to be transferred. The measure of divergence can characterize how precisely the first and second energy subsystems have adhered to the exchange of electrical energy stipulated by the control center.

In some embodiments, the measure of divergence can be taken as a basis for stipulating a divergence remuneration that the energy subsystem responsible for the divergence needs to forward to the respective other energy subsystems and/or the control center. In particular, the energy subsystem that provides a smaller amount of energy or is only prepared to receive a smaller amount of energy than stipulated by the control subsystem is responsible for the divergence. In particular, a contractual penalty can be stipulated on the basis of the divergence remuneration. The measure of divergence or the divergence remuneration can ensure that the energy subsystems perform the exchange of energy in accordance with the control by the control center.

In some embodiments, a control center is configured to perform a method as described herein. In particular, the control center can be a computing unit, in particular a server.

In some embodiments, there is an energy system having:
multiple control units for controlling a respective energy subsystem with regard to an exchange of energy of the energy subsystem with other energy subsystems, and
a control center for receiving first supply data from a first of the energy subsystems, wherein the first supply data comprise respective remuneration conditions of the first energy subsystem for receiving and/or providing energy, for transmitting the first supply data to a second of the multiple energy subsystems, for receiving second supply data adapted for the first supply data from the second energy subsystem, wherein the second supply data comprise respective remuneration conditions of the second energy subsystem for receiving and/or providing energy, and for controlling the exchange of energy between the first and the second energy subsystem in accordance with the first and second supply data.

In some embodiments, the energy system comprises the aforementioned control center configured to perform a method incorporating the teachings herein. The energy subsystems can be part of the energy system. In other embodiments of the energy system the control units are regarded as part of the energy system, but the energy subsystems are not.

The control centers and the energy systems described herein are each also developed by features as were already disclosed in association with the methods. For reasons of conciseness these features are not listed again at this juncture for the control center and the energy system.

Some embodiments include a computer program loadable directly into a memory of a control center, having program code means in order to carry out the steps of the methods when the program is executed in the control center. The computer program implements the methods on a control center when it is executed on the control center. Accordingly, some embodiments include a storage medium having electronically readable control information stored thereon that comprises at least the cited computer program and is designed such that it performs the methods taught herein when the storage medium is used in a control center. The storage medium can be configured for the digital or analog storage of data, for example. The storage medium may be capable of being written to once or multiple times and can be volatile or nonvolatile.

FIG. 1 shows a block diagram demonstrating an overview of multiple control units 4 and a control center 2, which together are part of an energy system 1. FIG. 1 moreover shows multiple energy subsystems 3 and a distribution grid 5, also called electricity grid or electrical grid, for example the 50 Hz interconnected grid. The multiple control units 4 are each assigned to precisely one of the energy subsystems 3. The control units 4 are configured to control the respective associated energy subsystem 3. In particular, the control units 4 are configured to control the generation and consumption of electrical energy by the applicable energy subsystem 3. Moreover, the energy subsystems 3 can be configured to control provision and reception of electrical energy with the distribution grid 5. To this end, the respective control unit 4 communicates with the applicable energy subsystem 3. In particular, the control units 4 are situated at the location of the respective energy subsystem 3. The control units 4 can also be referred to as respective energy management systems of the energy subsystems 3.

Each of the energy subsystems 3 can comprise for example one or more of the following installations: photovoltaic installation, biogas installations, cogeneration unit, electrical energy store (in particular stationary battery store), electric vehicle, wind generator. Additionally, the energy subsystems 3 can comprise consumers of electrical energy such as for example industrial installations, cooking appliances, washing machines or arbitrary household appliances. The control units 4 can be control computers of the respective energy subsystems 3. The energy subsystems 3 of the energy system 1 may be arranged in the same road, neighborhood, quarter, town, city, region, district, or otherwise in a prescribed area and/or within a particular radius.

The energy subsystems 3 are connected to the distribution grid 5 for the purpose of exchanging electrical energy. The energy subsystems 3 are therefore indirectly each connected to one another via the distribution grid 5. In this way the energy subsystems 3 can exchange electrical energy among one another. This exchange of electrical energy between the energy subsystems 3 is controlled by the control center 2 in the present case. To this end the control units 4 are each networked to the control center 2. This networking can be provided for example via the Internet, the mobile radio network, via another radio connection or by whatever means. For example the control center 2 is a server device or a server.

Figure 2:
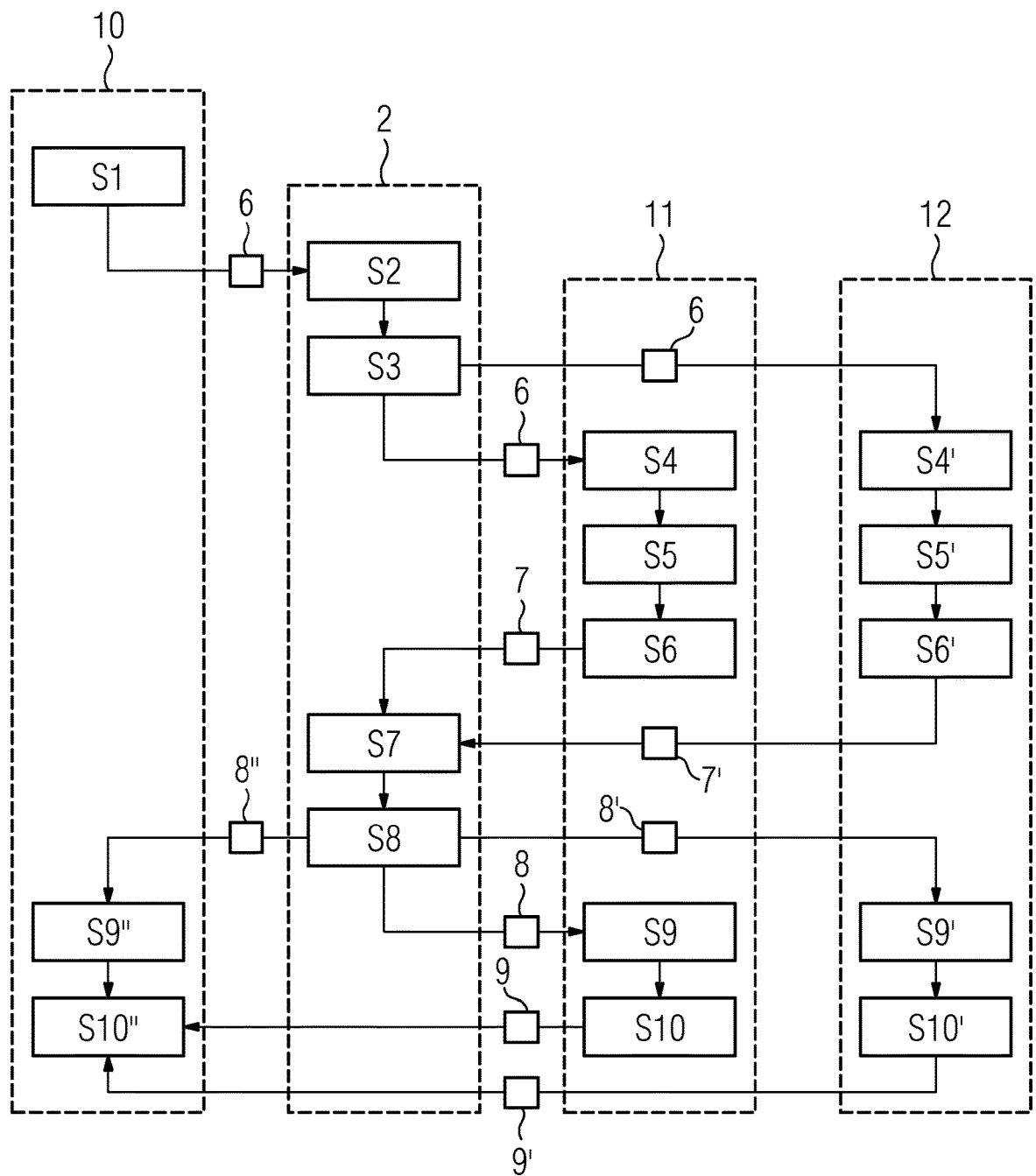
FIG. 2 shows a flowchart of an illustrative embodiment of a method incorporating teachings of the present disclosure.

FIG. 2 is a flowchart showing an example method for controlling the exchange of electrical energy in an illustrative embodiment. The energy subsystems 3 are numbered individually below as energy subsystems 10, 11, 12, as are the control units 4 as control units 20, 21, 22, to allow better distinction. In a step S1 a first energy subsystem 10, in particular the control unit 20 thereof, provides first supply data 6.

The first supply data 6 are determined or calculated for a specific discrete time interval t in particular in real time or beforehand (for example 1 hour, 2 hours, half a day or a whole day in advance). In some embodiments, a system state of the energy subsystem 10 (for example a state of charge of an electrical energy store of the energy subsystem 10) at the beginning of the time interval t and various predictions are taken into consideration in this instance. These predictions can relate for example to the weather, generation of electrical energy derived therefrom and/or estimates of an energy consumption within and/or outside the energy subsystem in the applicable time interval t. The predictions can be obtained for example from a weather service and/or from another prediction facility. In some embodiments, the predictions can relate to said variables for a longer period of time too, for example half a day or a whole day. All in all, this makes it possible to determine under what remuneration conditions, that is to say at what price, the energy subsystem 10 provides or demands what amount of electrical energy. The first supply data 6 are transmitted to the control center 2.

In a step S2 the first supply data 6 are received by the control center 2. Additionally, the first supply data 6 can be evaluated by the control center 2 in step S2. For example, the first supply data 6 can be transferred to a retrievable database by the control center 2. This database can be retrieved by the energy subsystems 3 or the control units 4. All of the supply data in the energy system 1 can be collected in such a database. Such a database can also be referred to by the technical term "open order book (COOB)".

This database can be used to combine the supply data of different energy subsystems 3. In particular, the database is used by the control center 2 to stipulate the exchange of energy between the energy subsystems 3.

Comparable first supply data 6 can be received from multiple energy subsystems 3 by the control center 2. The first supply data 6 can be deemed as fixed quotes in what is known as a "push strategy". The applicable energy subsystems 3, or the control units 4 thereof, can place the first supply data 6 as fixed quotes in the database of the control center 2. The control center 2 can logically combine the first supply data 6 of different energy subsystems 3, or of the control units 4 thereof, with one another. This possibly results in matching first supply data 6, matching meaning that the applicable first supply data 6 each result in a meeting between matching quotes and demands for electrical energy. In this case the control center 2 can control the exchange of electrical energy on the basis of the first supply data 6.

In a step S3, the control center 2 transmits the first supply data 6 to at least some of the other energy subsystems 3. In the present case the first supply data 6 are transmitted to the energy subsystems 11 and 12, or to the control units 21 and 22 thereof.

The energy subsystems 11 and 12, or the control units 21 and 22 thereof, receive the first supply data 6 in a respective step S4 or S4'. In a step S5, S5' the first supply data 6 are analyzed by the respective control units 21 and 22. Moreover, second supply data 7, 7' are determined or created by the control units 21 and 22 in step S5, S5'.

The second supply data 7, 7' are determined or calculated for a specific discrete time interval t in particular in real time or beforehand (for example 1 hour, 2 hours, half a day or a whole day in advance). The first supply data 6, and optionally a system state of the respective energy subsystem 11 or 12 (for example a state of charge of an electrical energy store of the respective energy subsystem 11 or 12) at the beginning of the time interval t and also optionally various predictions, are taken into consideration in this instance. These predictions can relate for example to the weather, generation of electrical energy derived therefrom and/or estimates of an energy consumption within and/or outside the respective energy subsystem 11 or 12 in the applicable time interval t. The predictions can be obtained for example from a weather service and/or from another prediction facility. In some embodiments, the predictions can relate to said variables for a longer period of time too, for example half a day or a whole day. All in all, this makes it possible to determine under what remuneration conditions, that is to say at what price, the respective energy subsystem 11 or 12 provides or demands what amount of electrical energy. The second supply data 7, 7' are adapted in particular for the first supply data 6 in this case. The second supply data 7, 7' are transmitted to the control center 2 in a step S6, S6'.

The second supply data 7, 7' can also be regarded as dynamic quotes in what is known as a "pull-optimize-push (POP) strategy". Translated, this means a "download-optimize-upload strategy". The first supply data 6 are retrieved from the database of the control center 2 regularly, repeatedly or periodically by the control units 4 of the applicable energy subsystems 3, and second supply data 7, 7' adapted therefor are stored in the database.

In a step S7, the second supply data 7, 7' are received by the control center 2. The second supply data 7, 7' can likewise be placed in the database of the control center 2.

In a step S8, the control center 2 controls the exchange of electrical energy between the energy subsystems 3. In particular, the control center 2 controls the exchange of electrical energy between the first energy subsystem 10 and one or both of the energy subsystems 11 and 12. For example, the first supply data 6 contain a quote for the first energy subsystem 10 to provide a specific amount of energy. In this case the control center can control the exchange such that at least part of the specific amount of energy is received by the energy subsystems 11 and/or 12 in accordance with the second supply data 7, 7'. In some embodiments, as described above, the exchange of electrical energy between the first energy subsystems 10 and a further energy subsystem 3 can be controlled on the basis of the first supply data 6 of the energy subsystem 10 and on the basis of further first supply data of the further energy subsystem 3. In another example, the first supply data 6 from the first energy subsystem 10 contain a demand for a specific amount of energy.

The control according to step S8 can be effected by virtue of the first energy subsystem 10 and the second energy subsystems 11 and/or 12 each being assigned an amount of energy 8, 8', 8" needing to be transferred. This amount of energy 8, 8', 8" needing to be transferred can be stipulated by the control center 2. The amount of energy 8, 8', 8" needing to be transferred can subsequently be transmitted to the applicable energy subsystems 10, 11, 12 by the control center 2. For example, the control center 2 uses the amount of energy 8, 8', 8" needing to be transferred to stipulate that the second energy subsystems 11 and 12 each need to meet at least part of the demand of the first energy subsystem 10 for the specific amount of energy. In other words, the control center 2 in this example controls the transfer by each of the second energy subsystems 11 and 12 of a partial amount of the specific amount of energy demanded by the first energy subsystem 10 to the first energy subsystem 10.

A distance between the energy subsystems 10, 11, 12 can be taken into consideration when controlling the exchange of electrical energy in step S8. In some embodiments, a distance-dependent grid utilization remuneration is determined by the control center 2. The grid utilization remuneration may be higher the further the energy subsystems 10, 11, 12 are away from one another. The grid utilization remuneration can additionally be dependent on a grid utilization level of the distribution grid 5. In particular, the grid utilization remuneration is higher the higher the utilization level of the distribution grid 5 is already. This grid utilization remuneration can be taken into consideration by the control center 2 when comparing the remuneration conditions that are part of the first 6 and second 7 supply data. In some embodiments, the first supply data 6 can be modified by the control center 2 in step S3 such that they contain the grid utilization remuneration. For example, the supply data 6 are extended by the grid utilization remuneration or offset against the grid utilization remuneration in step S3.

The control information for the amount of energy 8, 8', 8" needing to be transferred is received by the applicable energy subsystems 10, 11, 12 in a step S9, S9', S9". The energy subsystems 10, 11, 12 can subsequently transfer an actual amount of energy 9, 9' in accordance with the amount of energy 8, 8', 8" needing to be transferred. In the present example the second energy subsystems 11 and 12 transmit an actual amount of energy 9, 9' in accordance with the amount of energy 8, 8', 8" needing to be transferred.

In the present case, a measure of divergence is additionally determined that characterizes or quantifies a divergence between the amount of energy 9, 9' actually transferred and the amount of energy 8, 8', 8" needing to be transferred. If the whole amount of energy 8, 8', 8" needing to be transferred cannot be provided by one of the second energy subsystems 11 or 12, this is taken into consideration by means of the measure of divergence. The measure of divergence can additionally be used by the control center 2 to stipulate a divergence remuneration or a contractual penalty.

All in all, each of the energy subsystems 3, or the applicable control units 4, can transmit a respective tuple of demanded or offered amount of energy and a price per amount of energy to the control center 2 in first supply data 6 and/or second supply data 7. These tuples can be stored by the control center 2 in the database thereof. In this instance the control center 2 always attempts to "match", that is to say to logically combine, the supply data 6, 7, or tuples, stored in the database. In a further configuration the supply data 6, 7 can comprise, rather than the tuple, a triple, which additionally indicates a respective time interval t for which the quote or the demand is valid. If matching supply data 6, 7, that is to say for example a quote and a demand for an amount of energy in a specific time interval t, occur in the database, the control center 2 can control an exchange of energy in accordance with the matching supply data 6, 7.

The methods can involve individual grid fees being defined for individual "transactions". A transaction takes place in this instance when one energy subsystem 3 generates a specific amount of electrical energy at a specific location in a specific time interval t and another energy subsystem 3 consumes this amount of electrical energy minus losses at another location in the same time interval t. The grid utilization remuneration (also called grid fees) can be stipulated individually, since each energy subsystem 3 can inspect present supply data, which may also be implemented as bids in a similar manner to an auction, in the database and it is thus possible for individually tailored grid fees to be added to the bids. The grid fees may be location and time dependent. In this instance the grid fees can be determined by regarding a model of the distribution grid 5. The grid fees can be stipulated either directly by the control center 2 or by a third party, in particular the grid operator. The individual grid fees can encourage system-friendly behavior. For example, primarily local generation and consumption take place in this case. Furthermore, the following further advantages are obtained as a result: the existing technical grid infrastructure of the distribution grid 5 (electrical grid, transformers, switches and so on) is better utilized. This avoids otherwise necessary investment in additional infrastructure. The existing infrastructure is also not overloaded.

The bidding of the individual participants ("push" and "POP" strategy) is effected in each case after solving an optimization problem (for example optimum control or optimization of operation). Present measured values denoting the system state and forecasts play a role in this instance. A reference price can be used for the "push strategy" in order to perform optimization of the operation of the energy subsystem. The amount of energy ascertained in this instance can be transmitted to the control center 2 after discount or supplement (profit in comparison with the reference price).

The negotiated amounts of energy need to be taken into consideration by each respective control unit 4 for each respective energy subsystem 3 for the optimization of operation that follows, and a plan for the exchange of energy, drawn up by the control center 2, needs to be adhered to accordingly (communication of the plan e.g. to a feedback control unit). In the event of divergences greater than a defined (absolute or relative) tolerance range, (individualized) fines become due.

The methods can also be used for "failure situations". In these situations e.g. a technical unit of an energy subsystem 3 (e.g. a cogeneration unit) fails for a specific time. Alternatively, the prediction of the solar generation of an energy subsystem is particularly poor for a specific day. Each control unit 4 can take this failure or the incorrect prediction into consideration during optimization and can use appropriate supply data to transmit an appropriate bid to the control center 2 in order to purchase electrical energy elsewhere and thus to prevent a failure or nonfulfillment of its bids.

LIST OF REFERENCE SIGNS

1 Energy system
2 Control center
3 Energy subsystem
4 Control unit
5 Distribution grid
6 Supply data
7 Supply data
8 Amount of energy
9 Amount of energy
10 Energy subsystem
11 Energy subsystem
12 Energy subsystem
20 Control unit
21 Control unit
22 Control unit
S1 . . . S10 Method steps

The invention claimed is:

1. A method for controlling an exchange of energy in an energy system with multiple energy subsystems connected to one another for exchanging energy, the method comprising:
    receiving first supply data at a control center from a first energy subsystem, wherein the first supply data represent respective remuneration conditions of the first energy subsystem for receiving and/or providing energy;
    transmitting the first supply data to a second energy subsystem;
    receiving second supply data at the control center, the second supply data responsive to the first supply data, from the second energy subsystem, wherein the second supply data represent respective remuneration conditions of the second energy subsystem for receiving and/or providing energy, and
    controlling an energy exchange between the first energy subsystem and the second energy subsystem based on both the first supply data and the second supply data;
    wherein the first supply data are determined by the first energy subsystem on the basis of a system state of the first energy subsystem and/or the second supply data are determined by the second energy subsystem on the basis of a system state of the second energy subsystem;
    calculating a divergence between a previously forecast system state for a time interval and a system state determined later for the same time interval; and
    at least one of the first supply data and the second supply data are determined so the divergence is minimized.

2. The method as claimed in claim 1, wherein the first supply data and the second supply data both relate to a common time interval in which the exchange of energy is to be affected.

3. The method as claimed in claim 1, wherein the respective system state of the first energy subsystem and/or of the second energy subsystem is based on a measurement and/or a forecast.

4. The method as claimed in claim 1, wherein at least one of the first supply data and the second supply data are determined by the first energy subsystem or the second energy subsystem solving an optimization control on the basis of the respective system state and an increase in efficiency.

5. The method as claimed in claim 1, further comprising determining a grid utilization remuneration for a distribution grid.

6. The method as claimed in claim 5, further comprising:
    transmitting the grid utilization remuneration to the second energy subsystem together with the first supply data, and/or adapting the first supply data in accordance with the grid utilization remuneration.

7. The method as claimed in claim 5, further comprising determining the grid utilization remuneration on the basis of a distance between the first energy subsystem and the second energy subsystem and/or on the basis of a grid utilization level of the distribution grid.

8. The method as claimed in claim 1, further comprising determining an amount of energy to be transferred during control of the exchange of energy between the first energy subsystem and the second energy subsystem.

9. The method as claimed in claim 8, further comprising:
    determining an amount of energy actually transferred after the exchange of electrical energy has been effected; and
    determining a measure of divergence that characterizes a divergence between the amount of energy to be transferred and the amount of energy actually transferred.

10. An energy system comprising:
    multiple control units for controlling a respective energy subsystem with regard to an exchange of energy between the respective energy subsystem and one or more other energy subsystems; and
    a control center programmed to:
    receive first supply data from a first energy subsystem, wherein the first supply data represent respective remuneration conditions of the first energy subsystem for receiving and/or providing energy;
    transmit the first supply data to a second energy subsystem;
    receive second supply data adapted based on the first supply data, from the second energy subsystem, wherein the second supply data represent respective remuneration conditions of the second energy subsystem for receiving and/or providing energy; and
    controlling the exchange of energy between the first energy subsystem and the second energy subsystem based on the first supply data and second supply data;
    wherein the first supply data are determined by the first energy subsystem on the basis of a system state of the first energy subsystem and/or the second supply data are determined by the second energy subsystem on the basis of a system state of the second energy subsystem;
    calculating a divergence between a previously forecast system state for a time interval and a system state determined later for the same time interval; and at least one of the first supply data and the second supply data are determined so the divergence is minimized.

11. A non-transitory storage medium having a computer program stored thereon, the computer program comprising instructions which, when loaded and executed by a control center, cause the control center to control an exchange of electrical energy by:
receiving first supply data from a first energy subsystem, wherein the first supply data represent respective remuneration conditions of the first energy subsystem for receiving and/or providing energy;
transmitting the first supply data to a second energy subsystem;
receiving second supply data adapted based on the first supply data, from the second energy subsystem, wherein the second supply data represent respective remuneration conditions of the second energy subsystem for receiving and/or providing energy; and
controlling the exchange of energy between the first energy subsystem and the second energy subsystem based on the first supply data and second supply data;
wherein the first supply data are determined by the first energy subsystem on the basis of a system state of the first energy subsystem and/or the second supply data are determined by the second energy subsystem on the basis of a system state of the second energy subsystem;
calculating a divergence between a previously forecast system state for a time interval and a system state determined later for the same time interval; and
at least one of the first supply data and the second supply data are determined so the divergence is minimized.

12. A method for controlling an exchange of energy in an energy system with multiple energy subsystems connected to one another for exchanging energy, the method comprising:
receiving first supply data at a control center from a first energy subsystem, wherein the first supply data represent respective remuneration conditions of the first energy subsystem for receiving and/or providing energy;
transmitting the first supply data to a second energy subsystem;
receiving second supply data at the control center, the second supply data responsive to the first supply data, from the second energy subsystem, wherein the second supply data represent respective remuneration conditions of the second energy subsystem for receiving and/or providing energy;
controlling an energy exchange between the first energy subsystem and the second energy subsystem based on both the first supply data and the second supply data;
determining an amount of energy to be transferred during control of the exchange of energy between the first energy subsystem and the second energy subsystem;
determining an amount of energy actually transferred after the exchange of electrical energy has been effected; and
determining a measure of divergence that characterizes a divergence between the amount of energy to be transferred and the amount of energy actually transferred.

13. The method as claimed in claim 12, wherein the first supply data and the second supply data both relate to a common time interval in which the exchange of energy is to be affected.

14. The method as claimed in claim 12, wherein the first supply data are determined by the first energy subsystem on the basis of a system state of the first energy subsystem and/or the second supply data are determined by the second energy subsystem on the basis of a system state of the second energy subsystem.

15. The method as claimed in claim 14, wherein the respective system state of the first energy subsystem and/or of the second energy subsystem is based on a measurement and/or a forecast.

16. The method as claimed in claim 14, wherein at least one of the first supply data and the second supply data are determined by the first energy subsystem or the second energy subsystem solving an optimization control on the basis of the respective system state and an increase in efficiency.

17. The method as claimed in claim 12, further comprising determining a grid utilization remuneration for a distribution grid.

18. The method as claimed in claim 17, further comprising:
transmitting the grid utilization remuneration to the second energy subsystem together with the first supply data, and/or
adapting the first supply data in accordance with the grid utilization remuneration.

19. The method as claimed in claim 17, further comprising determining the grid utilization remuneration on the basis of a distance between the first energy subsystem and the second energy subsystem and/or on the basis of a grid utilization level of the distribution grid.

* * * * *